United States Patent
De Keyser et al.

(10) Patent No.: US 11,263,372 B2
(45) Date of Patent: Mar. 1, 2022

(54) METHOD FOR PROVIDING DETAILS TO A COMPUTER AIDED DESIGN (CAD) MODEL, A COMPUTER PROGRAM PRODUCT AND A SERVER THEREFORE

(71) Applicant: Bricsys NV, Ghent (BE)

(72) Inventors: Erik De Keyser, Ghent (BE); Pieter Clarysse, Vurste (BE); Luc De Batselier, Ghent (BE)

(73) Assignee: BRICSYS NV, Ghent (BE)

( * ) Notice: Subject to any disclaimer, the term of this patent is extended or adjusted under 35 U.S.C. 154(b) by 555 days.

(21) Appl. No.: 16/078,144

(22) PCT Filed: Mar. 7, 2016

(86) PCT No.: PCT/EP2016/054820
§ 371 (c)(1),
(2) Date: Aug. 21, 2018

(87) PCT Pub. No.: WO2017/152941
PCT Pub. Date: Sep. 14, 2017

(65) Prior Publication Data
US 2021/0012048 A1    Jan. 14, 2021

(51) Int. Cl.
*G06F 30/23* (2020.01)
*G06F 30/13* (2020.01)
(Continued)

(52) U.S. Cl.
CPC .............. *G06F 30/23* (2020.01); *G06F 30/12* (2020.01); *G06F 30/13* (2020.01); *G06T 17/205* (2013.01); *G06T 19/20* (2013.01)

(58) Field of Classification Search
CPC .......... G06F 30/13; G06F 30/23; G06F 30/12; G06F 16/29; G06T 19/20; G06T 17/205; G06T 17/005
(Continued)

(56) References Cited

U.S. PATENT DOCUMENTS

| 9,020,783 B2 | 4/2015 | Narayan |
| 2013/0013265 A1* | 1/2013 | Narayan ................. G06F 30/20 703/1 |
| 2015/0178988 A1* | 6/2015 | Montserrat Mora ... G06T 13/40 345/420 |

OTHER PUBLICATIONS

Autodesk, Creating and Updating Cross Sections, Mar. 4, 2016 (Year: 2016).*

(Continued)

*Primary Examiner* — Bijan Mapar
(74) *Attorney, Agent, or Firm* — Maschoff Brennan (57) ABSTRACT

In a first aspect, the current invention provides a method for manipulating a computer aided design (CAD) model, comprising the following computer-implemented steps of: —obtaining a composite object comprising a 3D geometry; —defining a 2D cross section of the composite object; —selecting a pattern of an event; —displaying the pattern; —applying modifications to the pattern, whereby the modifications are saved as a 2D patch, directly linked to the 3D geometry. The method according to an embodiment of the invention is particularly suitable for linking the maps providing 2D details, used on a construction site, to 3D composite objects and is particularly useful to avoid incompatibilities between the 2D and 3D information. In a second aspect, the present invention provides a computer program product for manipulating a CAD model. In a third aspect, the present invention provides a server for manipulating a CAD model.

20 Claims, 5 Drawing Sheets

(51) Int. Cl.
    *G06F 30/12*     (2020.01)
    *G06T 17/20*     (2006.01)
    *G06T 19/20*     (2011.01)

(58) Field of Classification Search
    USPC .............................................................. 703/1
    See application file for complete search history.

(56) References Cited

OTHER PUBLICATIONS

Jeffery Herimgartner, Employing CAD Blocks Effectively in Everyday Design, Feb. 9, 2016 (Year: 2016).*
Autodesk, To Work With Displaying Composite Object History, Dec. 16, 2015 (Year: 2015).*
CAD Project Point, Find and Replace Objects in AutoCad with dwgExplore, Feb. 8, 2016 (Year: 2016).*
Anonymous: "Customizing a CAD Block", Chief Architect Architectural Home Design Software; Jul. 16, 2015, XP002763711, Retrieved from the Intenet: URL:https://www.chiefarchitect.com/support/article/KB-00500/customising-a-cad-block.pdf.
Anonymous: "Adding Items to the Materials List", Chief Architect Architectural Home Design Software, Jul. 16, 2015, XP002763712, Retrieved from the Internet: URL:https://www.chiefarchitect.com/support/article/KB-00098/adding-tems-to-the-materials-list.pdf.
Finkelstein, Ellen, "AutoCAD 2005 and AutoCAD LT 2005", Wiley Publishing, Inc., Feb. 9, 2005.

\* cited by examiner

METHOD FOR PROVIDING DETAILS TO A COMPUTER AIDED DESIGN (CAD) MODEL, A COMPUTER PROGRAM PRODUCT AND A SERVER THEREFORE

This application claims the benefit of PCT/EP2016/054820 filed Mar. 7, 2016, International Publication No. WO 2017/152941 A1, which is hereby incorporated by reference in its entirety as if fully set forth herein.

TECHNICAL FIELD

The present invention relates generally to computer aided design (CAD) applications, and in particular, to a method, a computer program product and a server therefore for enabling, in a building information model (BIM) CAD application, direct manipulation techniques that allow providing details modifying the model with intuitive user interaction.

BACKGROUND

CAD software applications provide users with the capability to create and edit geometry, models and drawings using actions or commands. Typical CAD software applications are AutoCAD, Inventor, Solidworks, Spaceclaim, BricsCAD, etc.

Currently, the 3D models help users to visualize the design of a building, which can streamline collaboration. The use of 3D models is advantageous, as it enables to automate the quantity survey (measuring state) to compute volumes. Moreover, the 3D models are useful for the normalization of the heating.

In practice, it is hard/impossible to provide all details in the 3D view of the model (like different foils between a floor and a wall), because the level of detail (LOD) needs to remain feasible. Too much detail (like the inclusion of foils) in the 3D model is not profitable, as the drawing time increases drastically and the amount of data to be stored is excessive. Therefore, these details are often provided on separate, external 2D plans, which can be intersections of the 3D model. However, these amended 2D plans are currently autonomous and are not directly linked to the 3D model, which can result in incompatibilities (e.g. when the 3D model is changed afterwards, the autonomous amended 2D plan is not automatically updated). On a construction site, these 2D sections are often used and the discordances can result in issues on site, leading to downtime. This increases the production cost drastically, due to inefficient time use of expensive contractors.

U.S. Pat. No. 9,020,783 discloses a method and apparatus for enabling direct manipulation techniques in a building information model (BIM) CAD application. The method of U.S. Pat. No. 9,020,783 selects sub-objects of a composite object 3D model in a 2D or 3D view and enables amending the sub-objects in a separate drawable interface. The 3D model is dynamically updated and displayed according to the changes of the sub-objects. Nevertheless, using this method it is time-consuming to apply similar changes to other sub-objects, which require similar adjustments. Each of the different sub-objects is presented in a separate drawable interface instance, complicating the management of sophisticated composite objects comprising a large number of sub-objects. Moreover, the updating of the minute details to the 3D model is memory exhaustive and is pointless in many cases, as in practice only 2D cross sections are used to get detailed structural information. The method of U.S. '783 is designed for corrections at the macro-level, but is less suitable for providing details on smaller scales.

There remains a need in the art for an improved method that enables refining a conceptual 3D model, providing detail in more accurate 2D cross sections, which remain compatible with the 3D model at all stages of a project. In practice, the architect needs to determine any problem areas and get a feel for the type of requirements a particular building may have as the design progresses. In the preliminary analysis, engineers are often looking for quick early-stage approximate answers to make quick decisions that can later be refined into more accurate solutions for the (2D) production drawings. At all stages, the detailed 2D cross sections should be synchronized with the general 3D model (e.g. in case the 3D model is modified, the software needs to check the consistency of the 2D detailed plans with the modified 3D model and/or warn the user that incompatibilities could have emerged due to the changes in the 3D model). Often similar modifications need to be applied throughout the composite object on cross sections comprising/containing the same objects. For the sake of efficiency, it is therefore important that these modifications can be recycled and can be reused on other positions of the composite object or in new projects. Said software is by preference compatible with standard software applications like AutoCad. The prior art fails to provide such capabilities.

The present invention aims to resolve at least some of the problems mentioned above.

The invention thereto aims to provide a single set of tools that can be used from concept through completion, in the same environment, while allowing the user to design in a natural, interactive, direct, and desirable manner.

SUMMARY OF THE INVENTION

In a first aspect, the present invention provides a method for manipulating a computer aided design (CAD) model, comprising the following computer-implemented steps of:
 obtaining a composite object comprising a 3D geometry;
 defining a 2D cross section of the composite object;
 selecting a pattern of an event;
 displaying the pattern;
 applying modifications to the pattern,
whereby the modifications are saved as a 2D structure, directly linked to the 3D geometry, as described in claim 1.

The method according to an embodiment of the invention is particularly suitable for linking the maps providing 2D details, used on a construction site, to 3D composite objects and is particularly useful to avoid incompatibilities between the 2D and 3D information.

In a second aspect, the present invention provides a computer program product for manipulating a CAD model, as described in claim 15.

In a third aspect, the present invention provides a server for manipulating a CAD model, as described in claim 16.

DETAILED DESCRIPTION OF THE INVENTION

The present invention concerns a method, a computer program product and a server for manipulating a CAD model in order to provide the model with details.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

BIM involves representing a design as combinations of "objects", which are vague and undefined, generic or product-specific, solid shapes or void-space oriented (like the shape of a room), that carry their geometry, relations and attributes. BIM design tools allow extraction of different views from a building model for drawing production and other uses. These different views are automatically consistent, being based on a single definition of each object instance. BIM software also defines objects parametrically; that is, the objects are defined as parameters and relations to other objects, so that if a related object is amended, dependent ones will automatically also change. Each model element can carry attributes for selecting and ordering them automatically, providing cost estimates as well as material tracking and ordering.

Building information modeling (BIM) is a process involving the generation and management of digital representations of physical and functional characteristics of places. BIMs are files (often but not always in proprietary formats and containing proprietary data) which can be exchanged or networked to support decision-making about a place. Current BIM software is used by individuals, businesses and government agencies who plan, design, construct, operate and maintain diverse physical infrastructures, such as water, wastewater, electricity, gas, refuse and communication utilities, roads, bridges and ports, houses, apartments, schools and shops, offices, factories, warehoused and prisons.

Traditional building design was largely reliant upon two-dimensional drawings (plans, elevations, sections, etc.). Building information modelling extends this beyond 3D, augmenting the three primary spatial dimensions (width, height and depth) with time as the fourth dimension and cost as the fifth dimension. BIM therefore covers more than just geometry. It also covers spatial relationships, light analysis, geographic information, and quantities and properties of building components (for example, manufacturers' details).

With the term "type" is made reference to pre-defined types of objects. Objects can be assigned a particular type, e.g. a type of wall, window, load-bearing element, floor, door, roof, etc.

With the term "event" is made reference to a topology comprising two or more objects, preferentially of a given type, in a dependent relationship in the 3D geometry. An event can e.g. be the location in a 3D model where a floor makes contact with a wall or where a mainstay cuts a floorboard. In practice these locations need a more detailed map, which is provided on 2D cross sections of the 3D model. In a preferred embodiment, the different objects which meet in an event are of a particular defined type. As an example, the method can determine which type of objects are connected in a particular event, enabling searching for similar events which comprise the same type of objects.

The term "cross section" refers to the result of a section through a 3D model. This cross section consists of 2D geometry, comprising lines, curves, blocks, etc. Examples are any 2D section of a building, floor plans and elevations. These cross sections are typically produced by dragging a cursor over the 3D geometry of a composite object.

The term "pattern" refers to a 2D clipped geometry of a zone of interest in a cross section and is typically selected by a cursor action. The 2D clipped geometry comprises an event of interest. In practice, a pattern of an event requires an "anchor point", which is a reference point of the selected event. In particular, a secant or an intersection point between objects of the 3D geometry are convenient anchor points, which are assigned 2D or 3D coordinates.

With the term "patch", reference is made to an improved elaboration of the pattern of an event. Hence, a patch is associated with a pattern. After making a 2D section of a 3D model and selecting an event of interest by defining a pattern, it is possible to amend the details of the selected event in (an exploded view of) the 2D pattern (e.g. adding a foil between a floor and a wall) and save the changes in a patch, which replaces the 2D details of the event. A patch is valid not only for the made 2D section, but also for all adjacent 2D sections comprising the same objects. In case any objects comprised by the pattern are altered in the 3D geometry (adding/removing/replacing objects), new events arise and novel patches may be required.

A patch is linked with one or more particular events and can be saved for later use in a library of patches in a central database. In this library of patches, the types of the elements comprised by a patch are stored, in order to abstract the geometry to its most structural formulation. In a new project (or in a different event of the same project), the method enables replacing the patterns in the cross section with the stored patches that comprise or contain the same type of objects.

In a first aspect, the invention provides a computer-implemented method for manipulating a drawing, comprising the steps of:
  a) obtaining, in a computer-aided design (CAD) building information modelling (BIM) application, a composite object, wherein:
    i. the composite object comprises a combination of two or more objects defining a 3D geometry;
    ii. the two or more objects are arranged in a system of dependent relationships;
  b) defining a 2D cross section of two or more objects of the composite object;
  c) selecting a pattern of an event, which is a planar topology comprised by the 2D cross section of two or more objects in a dependent relationship in the 3D geometry;
  d) in response to the selecting, separately displaying, on a display device communicatively coupled to the computer, the selected pattern in a drawable interface instance;
  e) applying one or more modifications to the pattern,
whereby the one or more modifications are saved in a 2D patch, which comprises the cross section of the two or more objects comprised by the event and is linked to the pattern and/or the 3D geometry. The 2D patches are directly linked to the BIM design of the composite object. This method has the advantage that the modifications made in 2D remain 2D, hence not overloading the 3D model with detailed information. The possibility to provide detailed information on 2D instead of 3D models further drastically reduces the drawing time for a user. A 2D patch, defined in practice for a selected pattern in one particular 2D cross section, can be valid for all possible adjacent 2D cross sections, which define the same event. Therefore, a patch can be valid for coordinate ranges.

In an embodiment, the method comprises the step of assigning a type to at least one of the two or more objects.

In case the object types of the two or more objects comprised by an event are defined, the patch can save the types of the objects together with the modifications. This turns out to be convenient for other features of the method, as described below. If a user changes the type of an object comprises in a patch, the patch needs to be checked for consistency. In a preferred embodiment, the method prompts the user to perform this check.

The direct link of the saved patches with the 3D geometry of the composite object ensures that the patches can be tracked during the design of the composite object. On user command, the events provided with patches can be indicated in the composite object. Therefore, the method of the invention is particularly suitable for linking the maps providing 2D details, used on a construction site, to 3D composite objects.

The defining of said 2D cross section may be performed by receiving user clicking input via a cursor control device while a cursor is over/hovering over the 3D model. The displaying of the selected pattern in a drawable interface instance can provide an exploded view of the selected pattern, zooming in on the pattern and revealing details not visible in the 3D geometry of the composite object. Moreover, this pattern can be transient and dynamic. The one or more modifications applied to the pattern may comprise details, not perceptible in the 3D geometry. As an example, some particular foils can be indicated between a floor and a wall in the pattern and saved in a patch. This patch can be/is valid for the entire secant of the wall and the floor, as long as no other object interferes and changes the event (by adding or removing structural elements). Note that the addition of the foil (or any other detail, e.g. amending the connection details of floor and wall) in the 2D detailed version of the model, does not alter the event in the 3D geometry of the composite object.

In a preferred embodiment, the method comprises the step of storing the 2D patch in a library of a central database, provided on a server or apparatus. In this library, the saved patch is provided with a link to the modified pattern. As an example, the pattern is assigned a "pattern_ID" and the patch is linked to that particular pattern_ID. In practice, a patch can be linked to a number of pattern_IDs, e.g. based on an SQL-based environment. The choice of the environment is not meant to limit the scope of the invention. In the library, the types of the objects comprised by the patch are stored, in order to regard to the patches as topological elements. An architect can save all of the previous experiences/modifications/patches in said library, being a useful resource for future projects.

In a further preferred embodiment, the computer-implemented method comprises:
 a. in response to the defining, selecting and displaying one or more patterns representing one or more corresponding input parameters of the selected pattern; and
 b. the directly modifying the selected pattern by grip-editing one or more patterns representing one or more corresponding input parameters of the created pattern.

The grip-editing can be desired when applying modifications to the selected patterns, as it provides a user-friendly and organized manner to perform this operation.

In a preferred embodiment, the one or more 2D patches in the library can be reused/recycled in a different event. Patches can be reused provided that the different event comprises the objects comprised by the one or more 2D patches. In practice, similar events (i.e. events with a similar topology) are ubiquitous in the 3D geometry of a composite object. Therefore, it is useful and time-saving if a patch that was saved in the library, comprising all the desired detailed 2D information of an event, can be reused in different events. The different events comprise both events in the current composite object or in a composite object of another project. Note that the details of the patches for different applications can be different, e.g. in a dwelling another type of insulation is to be implemented than in a hospital.

In a preferred embodiment, the computer-implemented method prompts a user if one or more objects, encompassed by a pattern provided with a previously-defined patch, are modified in the 3D geometry, e.g. by the grip-editing, by dragging lines or by replacing objects. Due to this prompts/warnings, a user retains the overview of which patches were affected by the recent modifications. This is indispensable to maintain the overview in the design of complicated composite objects (e.g. multi-level buildings), avoiding issues of incompatible plans on-site. As such, a better price estimate can be given to a client, as unforeseen events are avoided and the BIM software can provide an estimate of the cost related to the building materials. Moreover, the contractor time lost on-site solving incompatible plans can be vastly reduced. In another embodiment, the previously-defined patches, affected by the modifications in the 3D geometry, are indicated in the 3D geometry.

In a further preferred embodiment, a user needs to verify and/or validate the previously-defined patch and check if the details added to the 2D pattern in the 2D patch remain valid in regard of the modified 3D geometry of the composite object. As such, the method ensures the compatibility between the overall 3D geometry of the composite object and the detailed information provided in the 2D patches. In case the 3D geometry was altered without changing the objects comprised in an event, a previously-defined patch remains valid. For such an event, no warning is given to a user.

In another embodiment, the method provides a list of the patches provided to the composite object, preferentially revealing the modification history (when/user/ . . . ). Moreover, these patches can be indicated in the 3D view of the model. These indications can be useful to remind a contractor that on a specific spot of the 3D model a detail has been provided, which should be checked before proceeding to the construction process. In another embodiment, the method can seek events which are not provided with a 2D pattern with detailed information.

In a preferred embodiment, the computer-implemented determines an anchor point when defining the pattern of the event. An anchor point is typically a secant or an intersection point between objects in the 3D geometry. This anchor point can be automatically selected by the method or can be selected/changed by the user. It provides a link between the topology of the pattern and the overall 3D geometry.

In a further preferred embodiment, the anchor point is provided with 3D coordinates, which are adjusted when the 3D geometry of the composite object is modified. The anchor point is indispensable when moving objects in the 3D model, as it serves as a reference for the patterns and ensures the link between the previously-defined patches, stored in a library, and the evolving composite object. The patch is stored in the library, linked with the pattern(s) and the corresponding anchor point(s). After a modification in the 3D model, the method detects if a pattern was modified by exact comparison of the 2D geometry of the new pattern and the stored patch linked to the pattern. The new pattern is defined by locating the new anchor point of the event, cutting out that part of the new cross section, as defined by the 2D closed contour of the pattern. As such, after changing the height of the second floor, everything on the 10$^{th}$ floor will move up. As the anchor point is relative to the particular floor and wall on the 10$^{th}$ floor, a new cutout will be made, containing exactly the same geometry as the old cutout. The coordinates of the anchor points are updated accordingly.

In a preferred embodiment, the method suggests one or more previously-stored patches for a (user-)selected event with a given topology, the previously-stored patches comprising the topology of the selected event. An architect, having stored some previous patches in the library, can choose to reapply any of the previously-stored patches to the selected event. This obviously results in a time-saving manner to design elaborate composite objects which require an extended set of details. Therefore, the library of the stored patches of an architect somehow serves as his experience and intellectual property.

In another embodiment, the computer-implemented method enables to search in the composite object for different events with a similar topology, i.e. comprising the same type of objects, as a (recently-)modified event provided with a patch and proposes to apply the patch of the (recently-)modified event to the different events with a similar topology. Obviously, a user can be prompted to ask if it is necessary and/or desirable to search for similar events at the current stage of the design. If the same patch is applied in several events, the patch is linked to these several events in the library. An architect, having stored some previous patches in the library, can choose to apply the recently-defined patch or some of the previously-stored patches to each of the events (with a similar topology) found by the method.

In a preferred embodiment of the method, the defining of the 2D cross section of the composite object and/or the selecting the pattern in an event comprises receiving user clicking input via a cursor control device while a cursor is hovering over the composite object and/or event. The cursor device provides a user-friendly tool to select regions of interest or to amend the patterns or the composite object.

In another preferred embodiment, the method enables to count events with a particular set of properties. Obtaining the exact amount of events with a user-defined set of properties, enables to make a quantity survey of the composite object. Therefore, a constructor can e.g. easily estimate how many special components, which only appear in the selected event, are necessary.

In another preferred embodiment the method regenerates the composite object after storing a patch in the library. This step is necessary to synchronize the patches with the 3D geometry of the model, updating and displaying the 3D composite object. This ensures the consistency between the 2D patches and the 3D geometry of the composite object. Furthermore, in a preferred embodiment, the method flags deviant details.

In another embodiment, the method provides the order of operations to be performed in a patch of a pattern, in order to explain to all users how the model was built and should be constructed on-site. The model elements may be iterated in proper sequence and the selected elements can be switched following user clicks, thereby allowing the users to traverse the various sequential stages of the model and track the history of the operations. Such capabilities help users understand the whole model by understanding the parts and how they are combined. The lack of understanding could give rise to a communication gap across architects and engineers working on the same project.

Events are generally defined with a reference to two or more elements that are in a dependent relationship in the 3D geometry. Exceptionally, as an extension, an event can be defined in a location of the 3D geometry where no objects interconnect. Therefore, events on a plane (like the façade of a house) are also possible.

In a preferred embodiment of the invention, the method draws the objects with a unique color and selection marker. Preferentially the line of demarcation is omitted if two objects of the same type are interconnected.

In a preferred embodiment, the method checks for events in the composite object without a patch, i.e. without a detailed drawing. In this manner, an architect can check if all the necessary details are provided. Events that do not require detailed information, can be assigned as such.

In a second aspect, the invention provides a computer program product for manipulating a drawing. Said computer program product comprising at least one computer-readable storage medium having computer-readable program code portions stored therein, the computer readable program code portions comprising instructions for:
  obtaining, in a computer-aided design (CAD) building information modelling (BIM) application, a composite object, wherein:
    the composite object comprises a combination of two or more objects defining a 3D geometry;
    the two or more objects are arranged in a system of dependent relationships;
  defining a 2D cross section of two or more objects of the composite object;
  selecting a pattern of an event, which is a planar topology comprised by the 2D cross section of two or more objects, each of which having a certain type, in a dependent relationship in the 3D geometry;
  in response to the selecting, separately displaying, on a display device communicatively coupled to the computer, the selected pattern in a drawable interface instance;
  applying one or more modifications to the pattern,
whereby the one or more modifications are saved in a 2D patch, which comprises the two or more objects of the event and is linked to the pattern and/or the 3D geometry. Hence, the 2D patches comprising the details of the 3D geometry are directly linked to the BIM application.

In a preferred embodiment, the computer program product enables to perform the computer-implemented method as described above.

In a third aspect, the invention provides a server for manipulating a computer aided design (CAD) model using a computer device connected to the server via a network, the server comprising:
  an input receiving module, the input receiving module configured to receive tasks from a user;
  at least one processor, the at least one processor configured to:
    obtaining, in a CAD building information modelling application, a composite object, wherein:
      the composite object comprises a combination of two or more objects defining a 3D geometry;
      the two or more objects are arranged in a system of dependent relationships;
    assigning a type to each of the objects;
    defining a 2D cross section of two or more objects of composite object;
    selecting a pattern of an event, which is a planar topology comprised by the 2D cross section of two or more objects, each of which having a certain type, in a dependent relationship in the 3D geometry;

in response to the selecting, separately displaying, on a display device communicatively coupled to the computer, the selected pattern in a drawable interface instance;

applying one or more modifications to the pattern, whereby the one or more modifications are saved in a 2D patch, which comprises the two or more objects of the event and is linked to the pattern and/or the 3D geometry. Therefore, the 2D patches comprising the details of the 3D geometry are directly linked to the BIM application.

The network used to connect to the server comprises the networks known in the state of the art, like the Internet, local area networks (LANs), wide area networks (WANs), system network architecture (SNA), or the like. Possible computer devices comprise personal computers or workstations, minicomputers or the like. This document does not intend to limit the use of any computers nor networks.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

The invention is further described by the following non-limiting examples which further illustrate the invention, and are not intended to, nor should they be interpreted to, limit the scope of the invention.

The present invention will be now described in more details, referring to examples that are not limitative.

EXAMPLES

Figure 1:
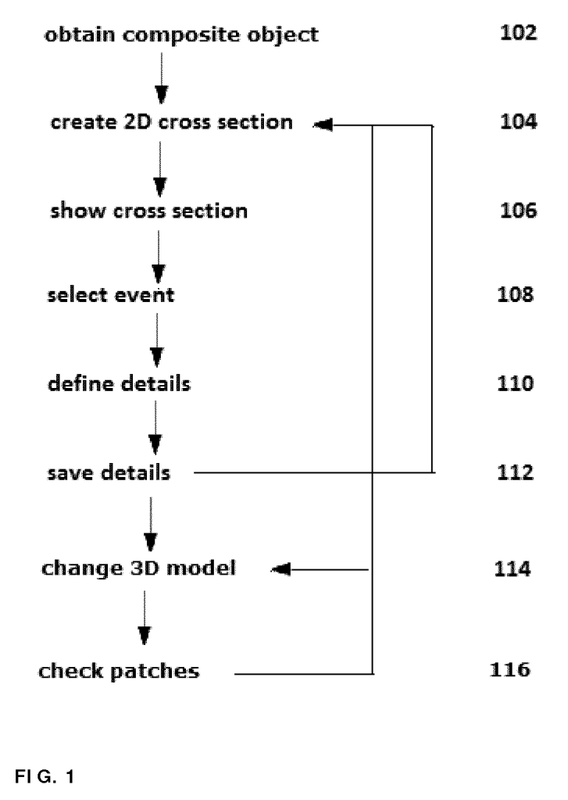
FIG. 1 shows an embodiment of a flow chart of the method for providing details to a CAD model.

FIG. 1 is a flow chart for manipulating a terrain in accordance with one or more embodiments of the invention. At step 102, a composite object of a terrain is obtained in a computer-aided design (CAD) building information model (BIM) application. The composite object comprises a 3D model and is a combination of two or more objects, comprising lines and curves. Each of the objects defines a geometry that is part of the terrain/composite object. Further, each of the two or more objects is a result of an operation and the two or more objects are arranged in a system of dependent relationships. Moreover, each of the objects is assigned a type (such as walls, floors, windows, support beams, etc.). In a preferred embodiment, each of the objects are drawn with unique colors and selection markers, allowing various elements to be easily identified and selected. The objects are drawn as colored contours in 2D view and colored faces in 3D solid-shaded view.

At step 104, a two-dimensional cross section of the 3D model is made. Such a cross section may be performed by receiving user clicking input via a cursor control device while a cursor is over/hovering over the 3D model.

At step 106, in response to the creation of the cross section, the cross section is separately displayed in its corresponding drawable interface instance. Such a display may cause the selected cross section to be displayed as a whole to its full extents. If an area of the cross section is selected after step 106, this area created from the reselected cross section may be displayed in the drawable interface instance in order to provide a more detailed view of the selected area. This area comprises one or more events, connecting two or more objects.

At step 108, an event (comprising two or more objects, preferentially of a different type) of the cross section is selected by a two-dimensional pattern. Said pattern selection may be performed by receiving user clicking input via a cursor control device while a cursor is hovering over the 2D cross section. Again, this pattern is separately displayed in a drawable interface instance. In a preferred embodiment of the invention, the method automatically selects an anchor point, which serves as a reference for the pattern. In practice, the junction of two or more different elements of the selected event are suitable anchor points.

At step 110, the pattern is modified by the user, who can apply detail to the 2D pattern. Additional lines, curves or objects of different types/classes can be added in the pattern by drawing directly in the interface instance by means of a cursor control device, or, by selecting and adding pre-defined objects to the pattern. In a preferred embodiment of the invention, the method browses in its history or library for similar events and proposes a list of previously-used modifications which were applied by a user in a similar case (even in the same 3D model, but in another event). Similar methods are time-efficient manipulation tools allowing users to provide details to 2D cross sections of a 3D design model. In a preferred embodiment, a user can indicate the different phases of the production process to provide the details of the construction in practice.

The set of modifications and details is comprised in a patch, which is saved at step 112 in a central database. This patch is internally linked to the identification number of the pattern (pattern_ID), which is preferentially linked with its corresponding anchor point. Moreover, the history of the amendments is saved. In case the order of the production phases was provided by the user, these are also included in the saved pattern. As such, all users (architects, contractors, engineers) can track the order of operations and are provided with all information on how the model was built. Optionally, the events which are provided with patches can be indicated by a symbol or color in the 3D model. Moreover, the patches can be listed, giving an overview to all users to which events amendments have been added (by what user, at what time).

In a preferred embodiment, the user can choose to look for equal events in the 3D model. The method automatically creates different patterns selecting the similar events. The user can choose to apply the same patch on the different patterns in the 3D model. In such case, the patch is internally linked to several pattern_IDs.

After saving the modifications (step 112) in a patch, thereby replacing the details in the 2D version of the model, a user can define a new 2D cross section, returning to step 104. Again, the user can pursue the process steps as described above.

However, instead of creating a new 2D cross section, a user may decide to change something in the composite 3D model (at step 114), e.g. displacing an object. The anchor points of the patterns are shifted together with the object, hence a previously defined pattern still refers to the same event after the changes on the macro level. If e.g. an object was added at the macro level, some events can be changed, because they can contain an additional object. The method checks (at step 116) all the events provided with patches that comprise elements that were changed at the "macro" level. The user is prompted and needs to confirm if the predefined patch is still valid according to the changes made in the 3D view of the model. This way, incompatibilities between the general 3D view and the detailed 2D cross sections are avoided.

After checking and validating the patches at step 116, a user may e.g. create a new 2D cross section (at step 104) or change the 3D model (at step 114).

Figure 2:
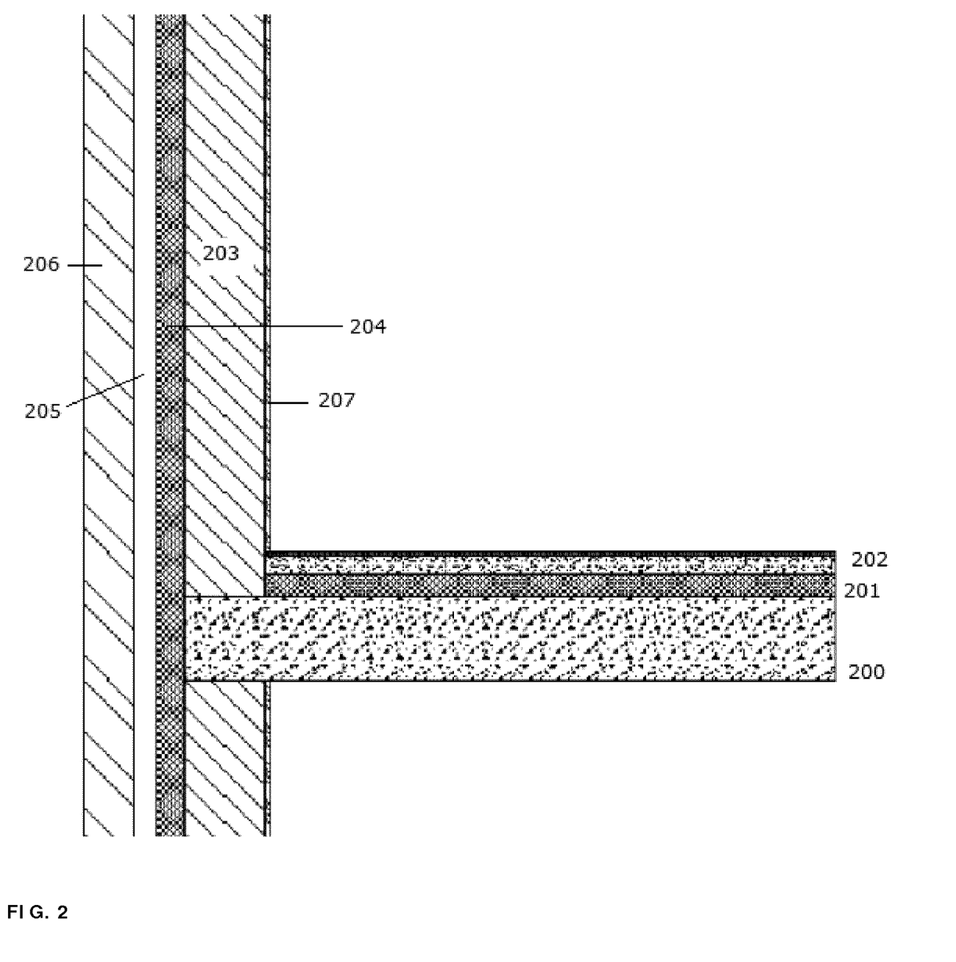
FIGS. 2 to 6 illustrate the different steps of an embodiment of the method based on a specific example.

In FIG. 2 an example of a cross section of a floor and wall is illustrated. The floor and wall are provided with various types of insulation, all indicated with a different shading/color. The different elements comprise a floorboard 200, floor insulation 201, flooring 202, the inner wall 203, the wall insulation 204, the cavity 205, the outer wall 206 and the plastering 207 of the inner wall. This 2D cross section is taken directly from the 3D view of a composite object.

Figure 3:
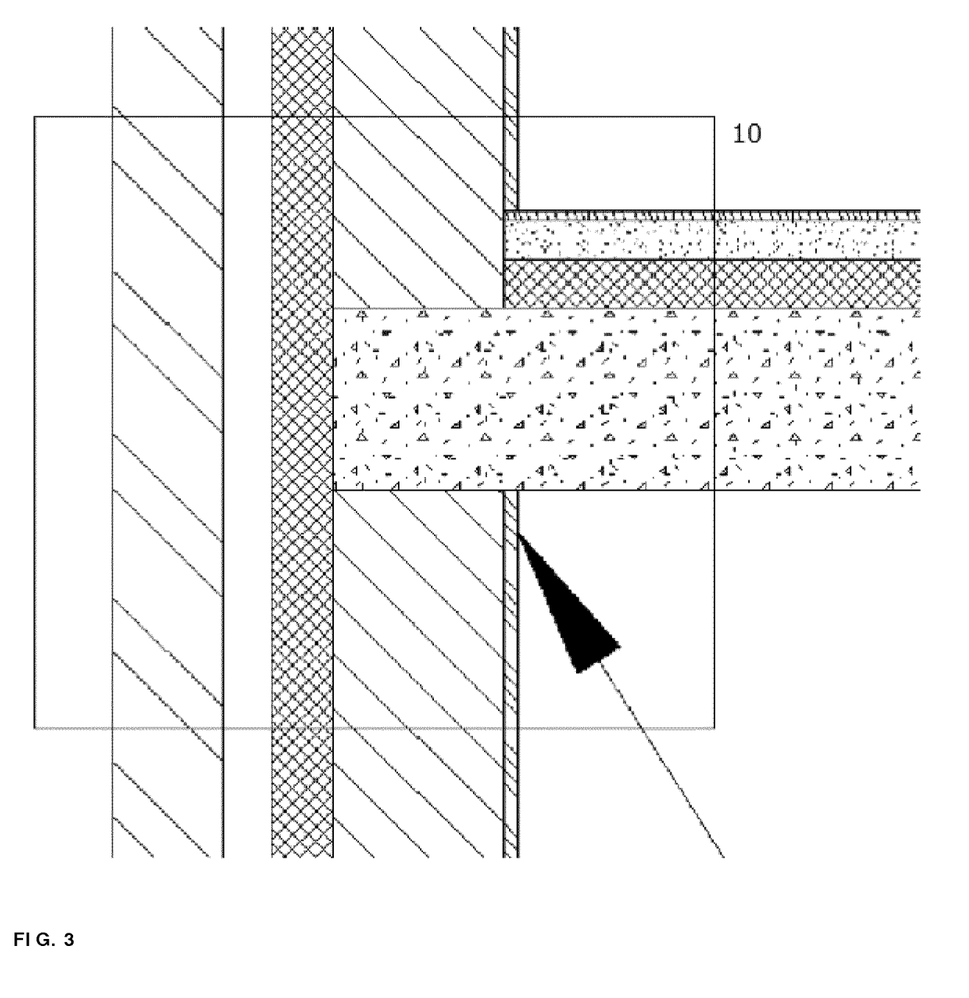

In FIG. 3 an event of interest, indicated with an arrow, is selected with a pattern 10. This pattern comprises all structural element comprised by the selection, i.e. floor, wall, different types of insulation, etc.

Figure 4:
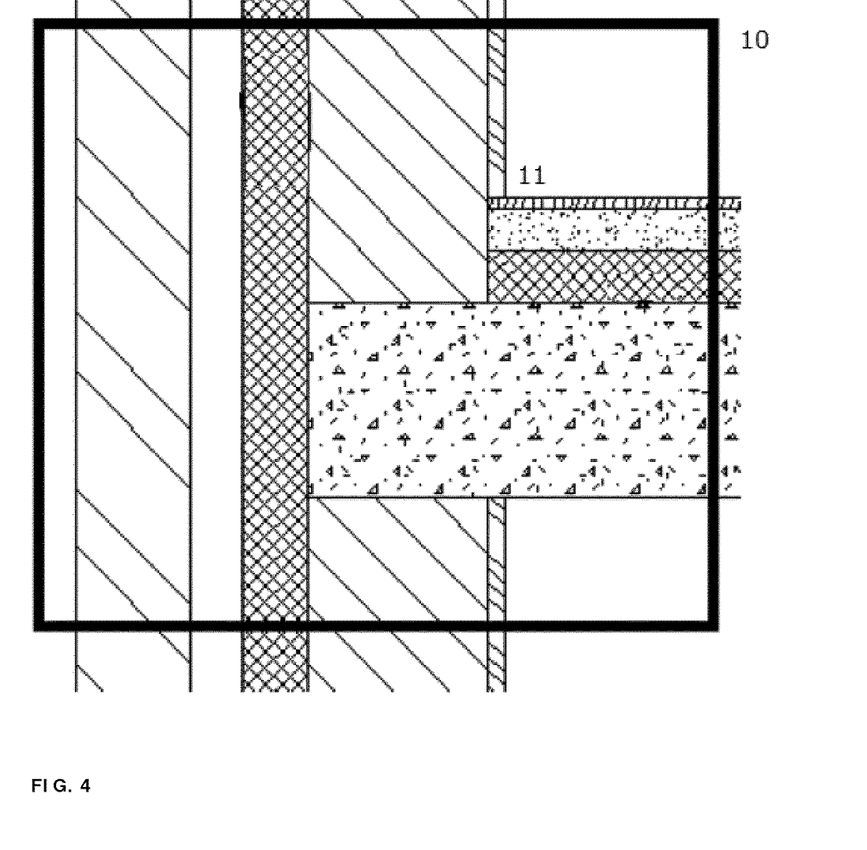

In FIG. 4, an exploded view of the selected pattern 10 is displayed, as is done by a preferred embodiment of the method. The zone of interest 11, where modifications are to be provided, is in this case the interconnection between floor, wall and insulation (which defines the event).

Figure 5:
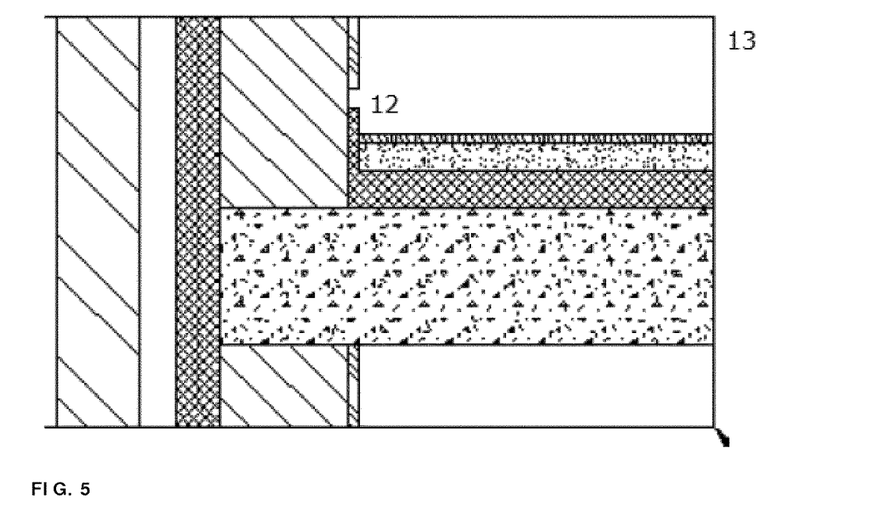
Figure 6:
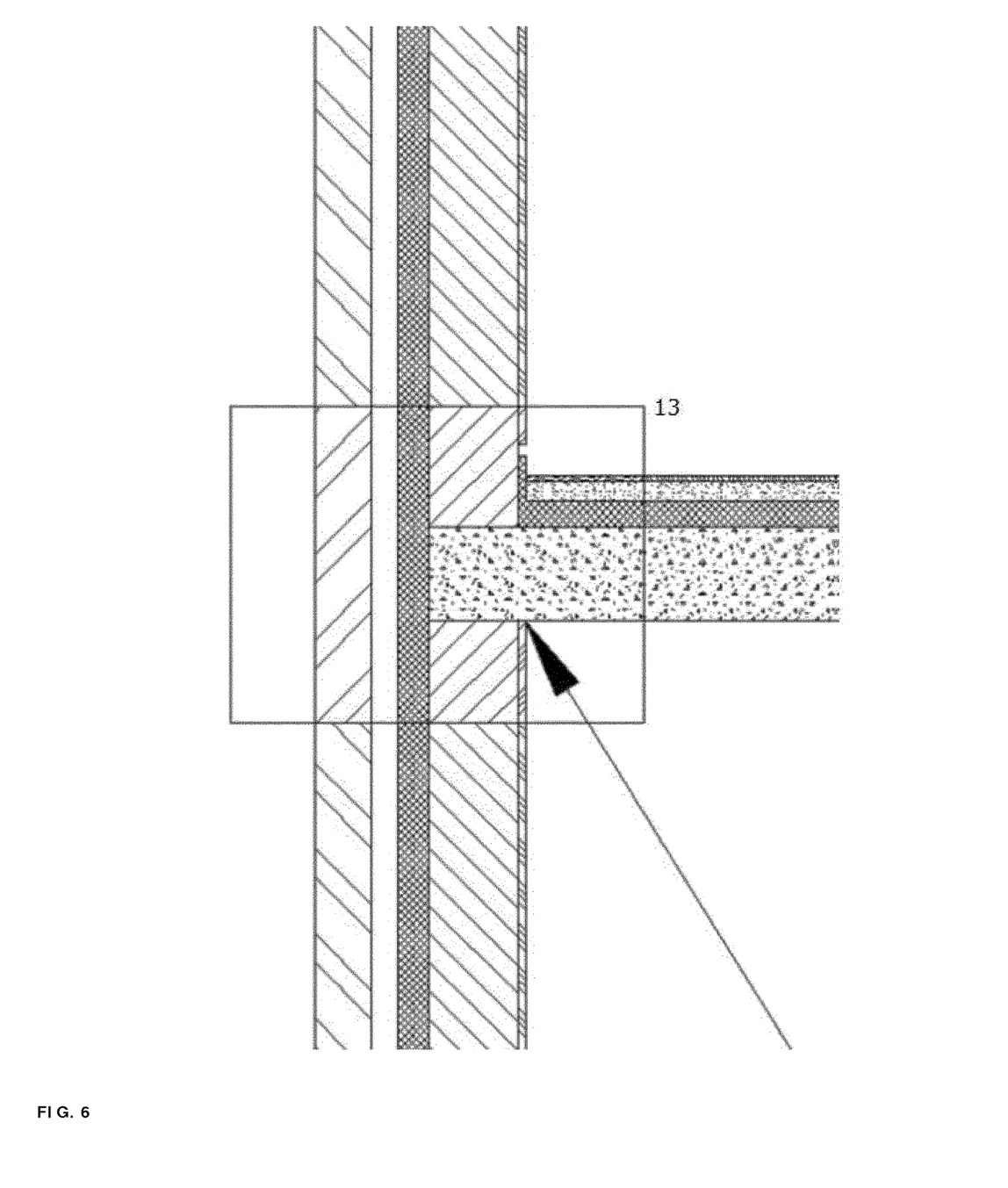

In FIG. 5, modifications 12 have been applied to the connection: the insulation that was only provided on the plane of the floor is now also provided at the floor-level of the wall, instead of the plaster. It is tedious to apply these modifications in the 3D view of 3D geometry of the composite object, as this is very time-consuming and unclear due to the overload of details. The modifications 12 are saved in a patch 13, stored in a library of a central database. This patch can be/is valid for all adjacent events that comprise the same objects, i.e. structural elements. In the 3D view, the small modifications are not perceptible nor applied. However, when a new cross section is made of the modified wall, the original structure is replaced by the new patch 13, as demonstrated in FIG. 6.

It is supposed that the present invention is not restricted to any form of realization described previously and that some modifications can be added to the presented example of fabrication without reappraisal of the appended claims.

The invention claimed is:

1. A computer-implemented method for manipulating a drawing, comprising the steps of:
   a) obtaining, in a computer-aided design (CAD) building information modelling (BIM) application, a composite object, wherein:
      i. the composite object comprises a combination of two or more objects defining a 3D geometry;
      ii. the two or more objects are arranged in a system of dependent relationships;
   b) defining a 2D cross section of two or more objects of the composite object;
   c) selecting a pattern of an event via cursor action in the 2D cross section, wherein the pattern is a 2D clipped geometry defined by a 2D closed contour, wherein the event is a planar topology comprised by the 2D cross section of two or more objects in a dependent relationship in the 3D geometry;
   d) in response to the selecting, separately displaying, on a display device communicatively coupled to the computer, the selected pattern in a drawable interface instance; and
   e) applying one or more modifications to the pattern to provide a modified pattern, whereby the modified pattern is saved in a 2D patch as a 2D structure separate from the 3D geometry, wherein the 2D patch comprises the cross section of the two or more objects comprised by the event and is linked to the pattern and/or the 3D geometry.

2. The computer-implemented method according to claim 1, wherein the method comprises assigning a type to at least one of the two or more objects.

3. The computer-implemented method according to claim 1, wherein the method further comprises the step of storing the 2D patch in a library of a central database.

4. The computer-implemented method according to claim 1, further comprising:
   a. in response to the defining, selecting and displaying one or more patterns representing one or more corresponding input parameters of the selected pattern; and
   b. directly modifying the selected pattern by grip-editing one or more patterns representing one or more corresponding input parameters of the created pattern.

5. The computer-implemented method according to claim 1, wherein one or more 2D patches in the library can be reused/recycled in a different event.

6. The computer-implemented method according to claim 1, comprising prompting a user if one or more objects, encompassed by a pattern provided with a previously-defined patch, are modified.

7. The computer-implemented method according to claim 6, comprising enabling the user to verify and/or validate the previously-defined patch.

8. The computer-implemented method according to claim 1, wherein an anchor point is determined when defining the pattern of the event.

9. The computer-implemented method according to claim 8, wherein the anchor point is provided with 3D coordinates, which are adjusted when the 3D geometry of the composite object is modified.

10. The computer-implemented method according to claim 1, comprising suggesting one or more previously-stored patches for a selected event with a given topology, the previously-stored patches comprising the topology of the selected event.

11. The computer-implemented method according to claim 1, comprising searching in the composite object for different events with a similar topology, comprising the same type of objects, as a modified event provided with a patch and proposes to apply the patch of the modified event to the different events with a similar topology.

12. The computer-implemented method according to claim 1, wherein the defining of the 2D cross section of the composite object and/or selecting the pattern in an event comprises receiving user clicking input via a cursor control device while the cursor control device is hovering over the composite object and/or event.

13. The computer-implemented method according to claim 1, comprising counting events with a particular set of properties.

14. The computer-implemented method according to claim 1, wherein the composite object is regenerated after storing the patch in the library.

15. A computer program product for manipulating a drawing, said computer program product comprising at least one computer-readable storage medium having computer-readable program code portions stored therein, the computer readable program code portions comprising instructions for:
   a. obtaining, in a computer-aided design (CAD) building information modelling (BIM) application, a composite object, wherein:
      i. the composite object comprises a combination of two or more objects defining a 3D geometry; and
      ii. the two or more objects are arranged in a system of dependent relationships;
   b. assigning a type to each of the objects;

c. defining a 2D cross section of two or more objects of the composite object;
d. selecting a pattern of an event via cursor action in the 2D cross section, wherein the pattern is a 2D clipped geometry defined by a 2D closed contour, wherein the event is a planar topology comprised by the 2D cross section of two or more objects, each of which having a certain type, in a dependent relationship in the 3D geometry;
e. in response to the selecting, separately displaying, on a display device communicatively coupled to the computer, the selected pattern in a drawable interface instance; and
f. applying one or more modifications to the pattern to provide a modified pattern, whereby the modified pattern is saved in a 2D patch as a 2D structure separate from the 3D geometry, wherein the 2D patch comprises the two or more objects of the event and is linked to the pattern and/or the 3D geometry.

16. A server for manipulating a computer aided design (CAD) model using a computing device connected to the server via a network, the server comprising:
an input receiving module, the input receiving module configured to receive tasks from a user;
at least one processor, the at least one processor configured to:
a) obtaining, in a computer-aided design (CAD) building information modelling (BIM) application, a composite object, wherein:
i) the composite object comprises a combination of two or more objects defining a 3D geometry; and
ii) the two or more objects are arranged in a system of dependent relationships;
b) assigning a type to each of the objects;
c) defining a 2D cross section of the composite object;
d) selecting a pattern of an event via cursor action in the 2D cross section, wherein the pattern is a 2D clipped geometry defined by a 2D closed contour, wherein the event is a planar topology comprised by the 2D cross section of two or more objects, each of which having a certain type, in a dependent relationship in the 3D geometry;
e) in response to the selecting, separately displaying, on a display device communicatively coupled to the computer, the selected pattern in a drawable interface instance; and
f) applying one or more modifications to the pattern to provide a modified pattern, whereby the modified pattern is saved in a 2D patch as a 2D structure separate from the 3D geometry, wherein the 2D patch comprises the two or more objects of the event and is linked to the pattern and/or the 3D geometry.

17. The computer-implemented method according to claim 1, wherein the 3D geometry of the composite object remains unaltered by the 2D patch linked to the pattern and/or the 3D geometry.

18. The computer-implemented method according to claim 1, wherein the method comprises:
f) defining a new 2D cross section of said two or more objects of the composite object; and
g) automatically displaying said new 2D cross section modified according to said one or more modifications of the 2D patch.

19. The computer-implemented method according to claim 8, wherein the anchor point is provided with 3D coordinates, which are adjusted when the 3D geometry of the composite object is modified, wherein the 2D patch is stored in a library of 2D patches in a central database, wherein the 2D patch is linked with the pattern and the corresponding anchor point.

20. The computer-implemented method according to claim 1, wherein the one or more modifications to the pattern comprise the addition of an object.

* * * * *